Feb. 4, 1936.    H. B. NEWTON    2,029,498
LAWN MOWER
Filed Aug. 2, 1934
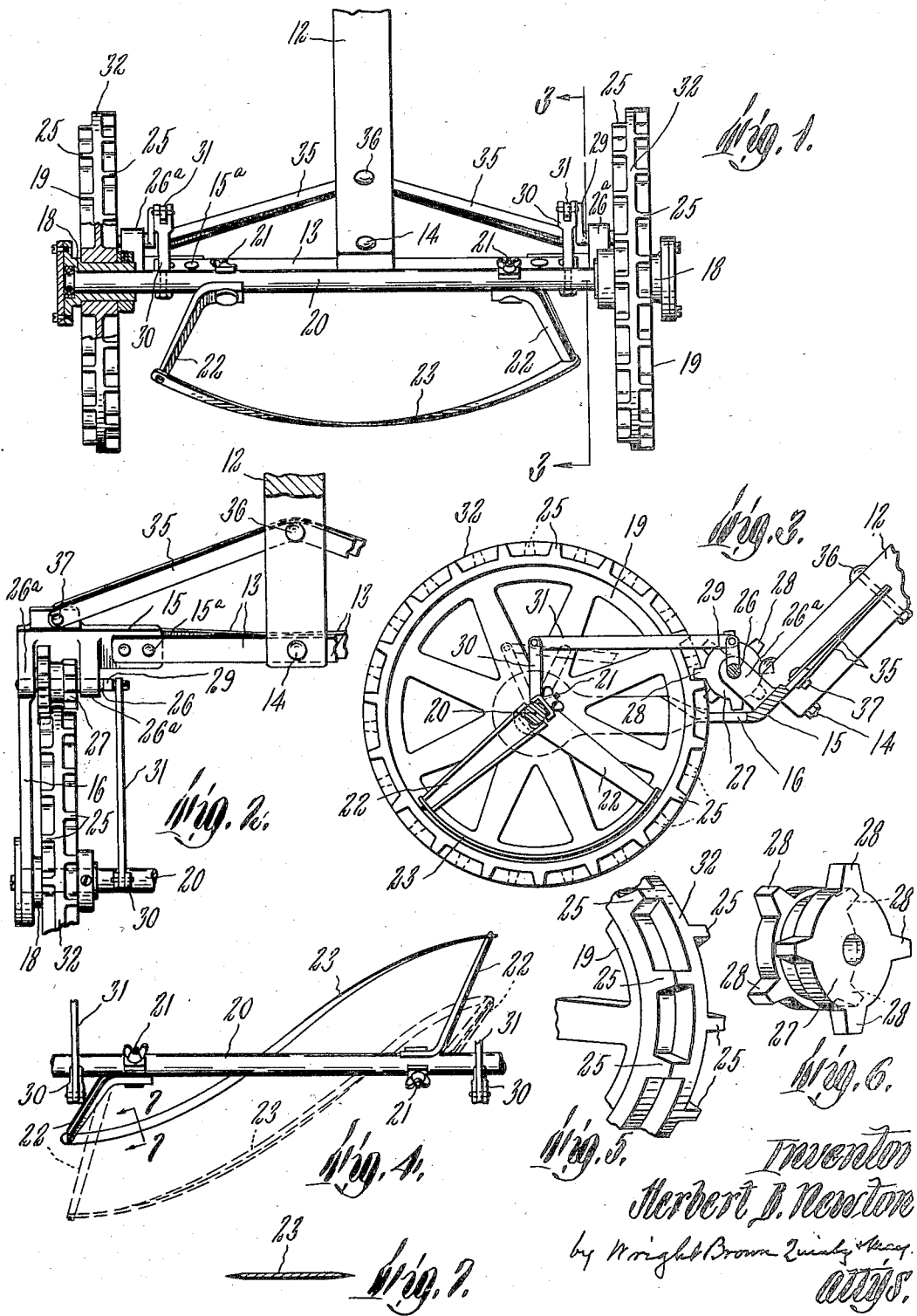

Patented Feb. 4, 1936

2,029,498

UNITED STATES PATENT OFFICE 2,029,498

LAWN MOWER

Herbert B. Newton, Brookline, Mass.

Application August 2, 1934, Serial No. 738,036

6 Claims. (Cl. 56—294)

This invention relates to a mower adapted to cut tall grass and weeds, and useful in cutting down relatively tall growths which may have escaped an ordinary lawn mower.

A mower embodying my invention has a knife secured by spider arms to a shaft supported by traction wheels, the knife being maintained by said arms in a parti-helical form with its cutting edge equidistant at all points from the shaft, the rotation of the shaft causing the cutting edge of the knife to swing in such direction that it cuts tall grass and weed stalks relatively near the ground without bending the stalks before cutting them.

One object of the invention is to provide a mower the knife of which has forward and rear cutting edges and a forward and backward oscillating movement under the shaft, each of said movements being more rapid than the progressive movement imparted to the mower, so that the knife, when moving in either direction, is adapted to cut tall grass and weed stalks left in its path, the impact of the knife against a stalk being a cutting impact and not a bending impact.

Other objects will appear as the description proceeds.

Of the accompanying drawing forming a part of this specification,—

Figure 1 is a front view of a mower embodying the invention, parts being shown in section.

Figure 2 is a fragmental top view.

Figure 3 is a section on lines 3—3 of Figure 1.

Figure 4 is a fragmental top view showing the extremes of the oscillating movement imparted to the knife.

Figure 5 shows in perspective a portion of one of the traction wheels.

Figure 6 is a perspective view of one of the driven gears hereinafter described.

Figure 7 is a section on line 7—7 of Figure 4.

The same reference characters indicate the same parts in all of the figures.

The carrying frame of the mower includes the usual push bar 12, and preferably includes also laterally extending arms composed of metal strips 13 attached at 14 to the forward end of the push bar and extending in opposite directions therefrom, end members 15 more fully described hereinafter fixed at 15ª to the laterally extending arms, and arms 16 extending forward from the end members 15. The end members 15 and arms 16 at one end of the frame are shown by Figures 2 and 3, and the other end member 15 and arm 16 are of similar construction.

The arms 16 are provided at their forward ends with sleeves 18 constituting external bearings on which are journalled the traction wheels 19, and internal bearings in which are journalled a rock-shaft 20. Fixed at 21 to the rock-shaft are spider arms 22. A blade 23 is fixed to said arms and maintained thereby with its cutting edge parti-helical and substantially equidistant at all points from the shaft.

My invention includes mechanism for rocking the shaft 20 in its bearings, and thereby imparting forward and backward oscillating movements to the blade, which preferably has two cutting edges as shown by Figure 7, one adapted to cut when the blade is moving forward, and the other when the blade is moving backward. Said shaft-rocking mechanism is organized to impart to the blade forward and backward movements which are faster than the progressive movement imparted to the mower by the carrying frame.

In the preferred embodiment of the invention here shown the shaft-rocking mechanism is organized as follows: Each traction wheel 19 is provided on its periphery with two series of gear teeth 25, the teeth of one series being staggered relative to those of the other, as best shown by Figure 5.

Journalled in bearings 26ª on the members 15 of the carrying frame are the shafts 26 of two driven gears 27, each having two series of gear teeth 28, the teeth of one series being staggered relative to those of the other, as best shown by Figure 6, and engaging the driving gear teeth 25.

Connections are provided between the driven gears 27 and the rock-shaft 20, organized to impart rocking movements from the driven gears to the rock-shaft, and forward and backward oscillating movements to the blade 23.

Said connections as here shown include crank arms 29 fixed to the driven gear shafts 26, crank arms 30 fixed to the rock shaft 20, and connecting rods 31 connecting said crank arms.

The periphery of each traction wheel has a central peripheral rib 32 from which the staggered gear teeth 25 project laterally. Said rib and teeth constitute anti-fouling traction means enabling the wheels to sufficiently engage the ground without liability of being clogged or fouled by earth.

It will will be seen that not only the traction wheel teeth 25, but also the driven gear teeth 28, are so widely spaced apart that liability of earth being confined between the teeth of either series is practically non-existent.

The carrying frame includes diagonal braces 35 fixed at 36 to the push bar 12, and at 37 (Figure 2), to the end members 15, said braces imparting a very desirable degree of rigidity to the frame.

An important advantage of the forward and backward movement of the blade is found in the fact that any wet grass adhering to the blade during the forward movement is wiped off during the backward movement.

It is obvious that there may be more than one blade if desired, the blades being parallel with each other.

As implied by the foregoing specification and some of the appended claims, I am not limited to the preferred embodiment of the invention shown by the drawing, except as otherwise required by the more limited claims.

I claim:

1. A tall grass and weed mower comprising a carrying frame having external and internal bearings, traction wheels journalled on the external bearings, a rock-shaft journalled in the internal bearings, spider arms fixed to the rock-shaft, a blade fixed to said arms and maintained thereby with its cutting edge parti-helical and substantially equidistant at all points from the shaft, and mechanism for rocking the shaft in its bearings to impart forward and backward oscillating movements to the blade.

2. A mower as specified by claim 1, the blade having two cutting edges, one adapted to cut when the blade is moving forward, and the other when the blade is moving backward, said shaft-rocking mechanism being organized to impart to the blades forward and backward movements which are faster than the progressive movement imparted to the mower by the carrying frame.

3. A tall grass and weed mower comprising a carrying frame having external and internal bearings, traction wheels journalled on the external bearings, a rock-shaft journalled in the internal bearings, spider arms fixed to the rock-shaft, a blade fixed to said arms and maintained thereby with its cutting edge parti-helical and substantially equidistant at all points from the shaft, two series of driving gear teeth on the periphery of each traction wheel, the teeth of one series being staggered relative to those of the other, driven gears journalled in bearings on the carrying frame, each having two series of gear teeth, the teeth of one series being staggered relative to those of the other, and engaging the driving gear teeth, and connections between the driven gears and the rock-shaft organized to impart rocking movements from the driven gears to the rock-shaft, and forward and backward oscillating movements to the blade.

4. A mower as specified by claim 3, the periphery of each traction wheel having a central peripheral rib from which the staggered gear teeth project laterally, said rib and teeth constituting anti-fouling traction means.

5. A mower as specified by claim 3, the carrying frame including a push bar, laterally extending arms fixed to the forward end of the push bar, end members fixed to said arms and forwardly extending arms fixed to the end members and supporting said external and internal bearings, and braces fixed to the push bar and to the outer ends of the laterally extending arms.

6. A weed and grass mower comprising in combination, a carrying frame, a rock shaft journalled in bearings on said frame, blade holding means fixed to the rock shaft, mechanism for rocking said shaft in its bearings organized to oscillate the blade holding means, and cutting means having oppositely facing cutting edges connected with said holding means, the arrangement being such that the cutting means is oscillated edgewise forward and backward relative to the direction of movement of the mower, the cutting edges of the cutting means extending obliquely to said direction, said edges alternating when cutting.

HERBERT B. NEWTON.